(12) United States Patent
Compas et al.

(10) Patent No.: US 7,930,692 B2
(45) Date of Patent: Apr. 19, 2011

(54) UPDATING INFORMATION IN NETWORK DEVICES

(75) Inventors: Jeffrey C. Compas, East Lehi, UT (US); Travis M. Stockwell, Riverton, UT (US)

(73) Assignee: Intel Corporation, Santa Clara, CA (US)

( * ) Notice: Subject to any disclaimer, the term of this patent is extended or adjusted under 35 U.S.C. 154(b) by 1287 days.

(21) Appl. No.: 11/502,984

(22) Filed: Aug. 10, 2006

(65) Prior Publication Data

US 2006/0277281 A1    Dec. 7, 2006

Related U.S. Application Data

(62) Division of application No. 09/738,389, filed on Dec. 14, 2000, now abandoned.

(51) Int. Cl.
*G06F 9/44* (2006.01)
*G06F 9/445* (2006.01)

(52) U.S. Cl. ........ 717/171; 717/168; 717/169; 717/172; 717/173; 717/174; 717/175; 717/176; 717/177; 717/178

(58) Field of Classification Search .................. None
See application file for complete search history.

(56) References Cited

U.S. PATENT DOCUMENTS

| | | | |
|---|---|---|---|
| 5,751,970 A * | 5/1998 | Bournas | 709/236 |
| 6,202,207 B1 | 3/2001 | Donohue | |
| 6,282,709 B1 | 8/2001 | Reha et al. | |
| 6,314,465 B1 * | 11/2001 | Paul et al. | 709/226 |
| 6,327,617 B1 | 12/2001 | Fawcett | |
| 6,745,224 B1 | 6/2004 | D'Souza et al. | |
| 6,789,255 B1 | 9/2004 | Pedrizetti et al. | |
| 6,801,927 B1 * | 10/2004 | Smith et al. | 709/202 |
| 6,965,934 B1 * | 11/2005 | Reynolds et al. | 709/224 |
| 7,171,482 B2 * | 1/2007 | Jones et al. | 709/231 |
| 2002/0046357 A1 | 4/2002 | Huang et al. | |
| 2002/0100036 A1 | 7/2002 | Moshir et al. | |
| 2003/0195949 A1 | 10/2003 | Slivka et al. | |
| 2003/0200541 A1 | 10/2003 | Cheng et al. | |
| 2004/0003266 A1 | 1/2004 | Moshir et al. | |
| 2009/0024991 A1 * | 1/2009 | Campbell et al. | 717/173 |

* cited by examiner

Primary Examiner — Insun Kang
(74) Attorney, Agent, or Firm — Blakely, Sokoloff, Taylor & Zafman LLP

(57) ABSTRACT

A method for obtaining information includes retrieving in a network device a listing of available information update packages and automatically updating the network device based on the listing. Transferring information update packages can include determining whether a network device is using a computer network connection and transferring portions of the package to the network device only while the network device is not using the network connection.

20 Claims, 4 Drawing Sheets

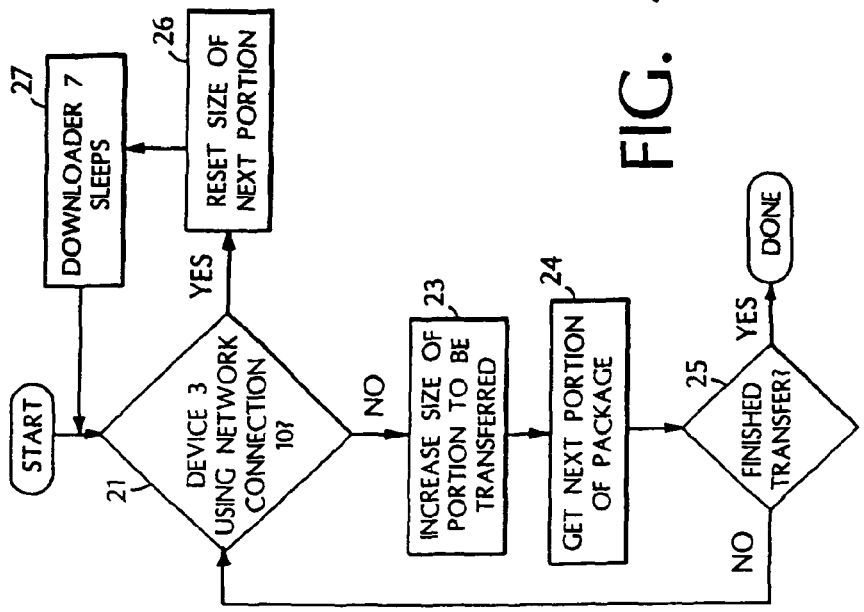

UPDATING INFORMATION IN NETWORK DEVICES

CROSS-REFERENCE TO RELATED APPLICATIONS

This application is a divisional application of and claims priority to U.S. application Ser. No. 09/738,389, filed on Dec. 14, 2000, now abandoned.

BACKGROUND

This invention relates to updating information in network devices.

In push-based methods to update information (such as software, data or documents) in network devices file servers that store the information initiate the transfer of update packages to the network devices when the network devices become available.

In pull-based methods of distribution, the copying of an update package from the server is initiated by the network device. Typically, the network device requests an update package from the server, downloads the package, and installs it.

In both of these methods, the communication bandwidth available to the user diminishes for other applications running on the network device while the transfer is in progress.

BRIEF DESCRIPTION OF THE DRAWINGS

FIG. 4 is a flow chart.
FIG. 6 shows a set of rules associated with conflicting client computer instructions.

DETAILED DESCRIPTION

Figure 1:
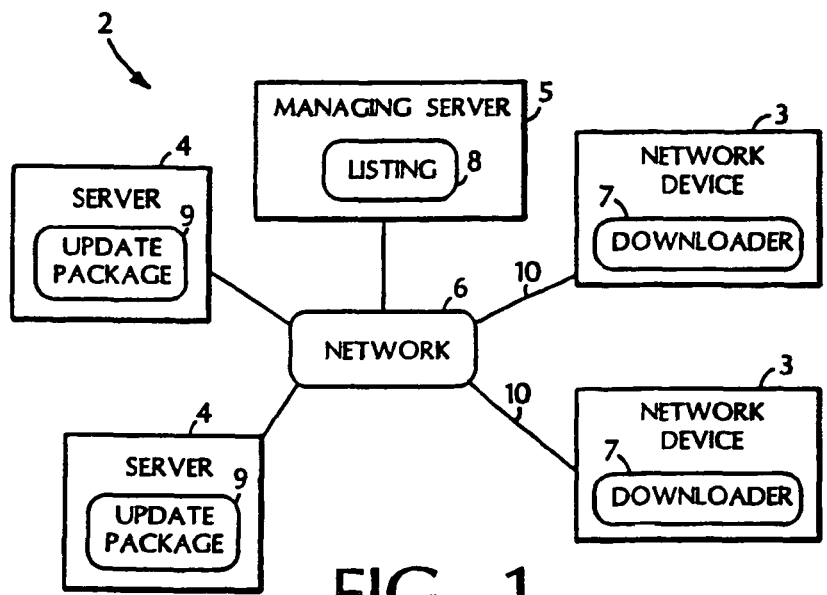
FIG. 1 shows a computer network system.

As shown in FIG. 1, a computer system 2 includes network devices 3 and file servers 4, 5 that can communicate over a network 6. Each network device 3 has a downloader component 7 that controls the automatic updating of information on that machine. A managing server 5 stores a listing 8 that contains information about available updates for the network devices. Update packages 9 can be stored on one or more servers 4.

In one such system, the Internet is the network 6, web servers are the file servers 4, 5, and Internet appliances or personal computers with connections to the Internet act as the network devices 3.

Figure 2:
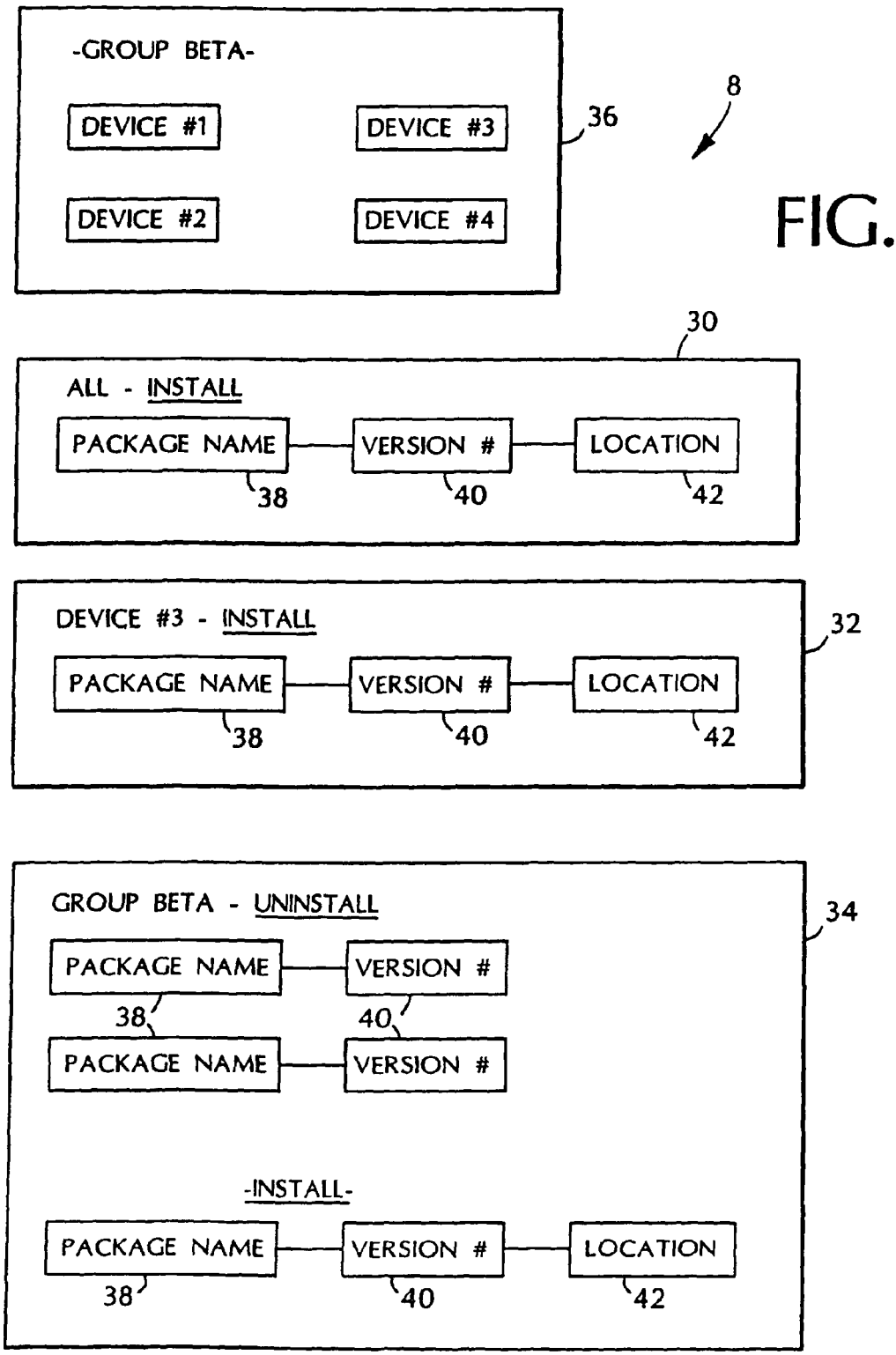
FIG. 2 shows a listing file.

An example of the listing 8 kept on the managing server 5 is shown in FIG. 2. In general, the listing 8 contains network device targeting information as well as descriptions of the available update packages 9. One section 30 in the listing 8 can list update packages that apply to all network devices. Other sections 32, 34 can list information applicable to individual network devices or groups of network devices that are defined (by listing) in another section 36 of the listing. The information about the update packages 9 includes the name 38, version 40, and location 42 of each package.

eXtensible Markup Language (XML) can be used as the encoding language for the listing file. Files expressed in XML can be stored as readable text files, are easily transported over existing networks through HyperText Transfer Protocol ("HTTP"), work well within existing networks, and are compatible with many languages and development environments. Also, using XML, new information about update packages 9 can be added without affecting the downloader components 7 already in place. Newer versions of the downloader component 7 easily can be implemented to operate on older versions of the listing 8.

Figure 3:
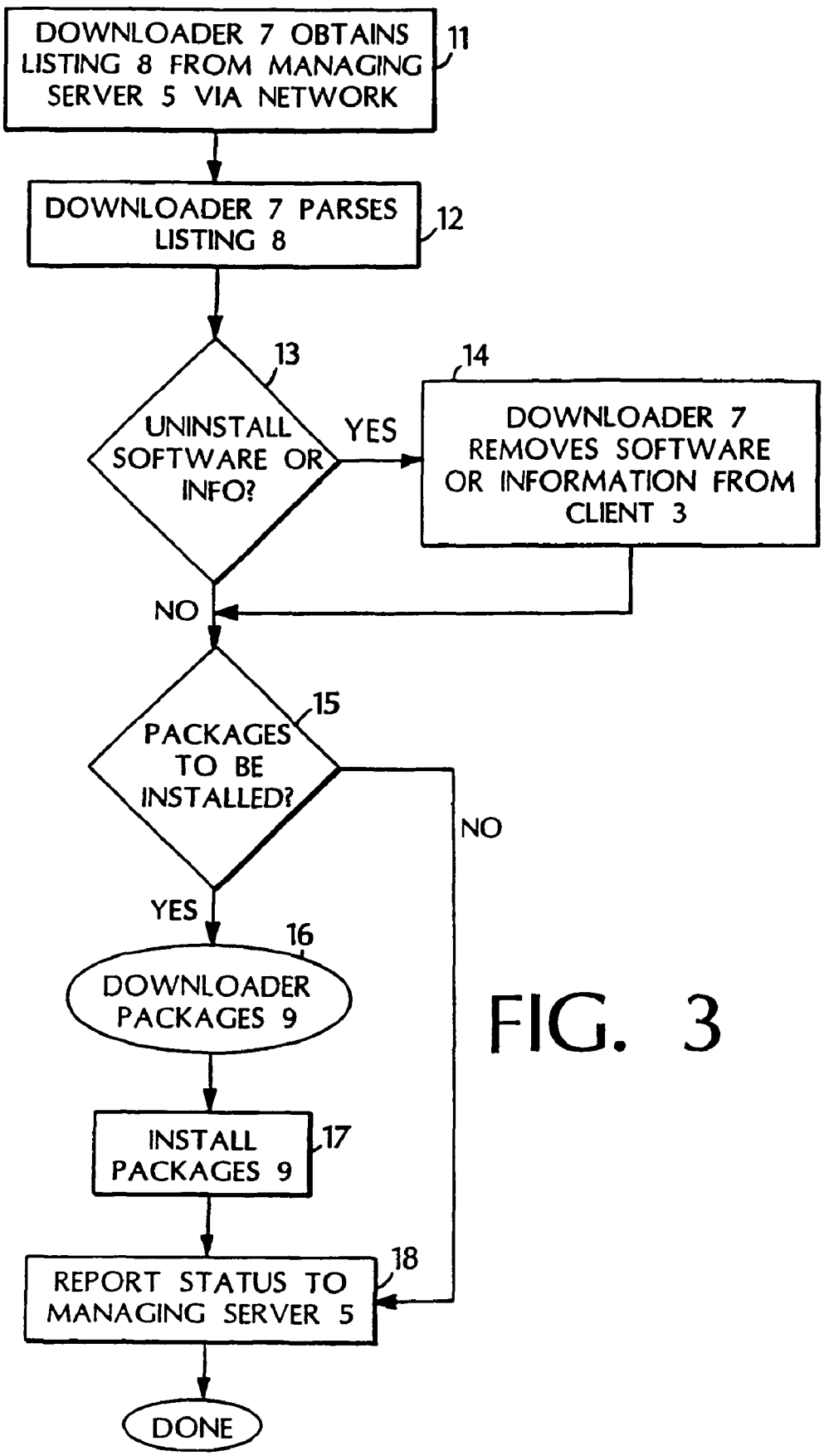
FIG. 3 is a flow chart.

As indicated by FIG. 3, to update information, the downloader component 7 in a particular network device 3 obtains 11 the listing 8 of available updates 9 from the managing server 5 through the network 6. This occurs automatically at times that can be set by the user or preset in the factory during manufacturing. The downloader 7 parses 12 the listing 8 for install and uninstall instructions for that particular network device 3.

The downloader 7 determines 13 whether any information stored on the network device 3 has to be removed to permit the update to occur. The downloader 7 then removes 14 any such information. Next, the downloader 7 identifies 15 what, if any, packages 9 are to be installed on the device 3 and on which servers 4 they are located. That information can be obtained from the listing file 8. The downloader 7 then downloads 16 the packages 9 and installs 17 the packages 9 on the network device 3.

After the packages 9 have been downloaded and installed, the downloader 7 sends 18 a status report to the managing server 5 so that, if there were any problems with the transfer or installation, the system's administrator can correct them.

FIG. 4 illustrates an implementation of an automatic downloading process in which each package 9 is transferred from the server 4 to the network device 3 in portions. Before each portion is transferred, the downloader component 7 initially checks 21 if the network device 3 is using the network 6 connection 10. If the connection 10 is not in use, the downloader 7 increases 23 the size of the portion to be transferred and retrieves 24 the next portion of the package 9 from the server 4. If the connection 10 is being used, the downloader 7 resets 26 the portion size to its original state and enters 27 a sleep mode for a period of time before checking 21 again. After transferring 23 each portion, the downloader 7 determines 25 whether the entire package 9 has been transferred. If transfer of the package 9 is still incomplete, the downloader 7 returns to block 21 and repeats the process of checking 21 the connection 10, increasing 23 the portion size, and retrieving 24 the next portion.

During the process of automatically downloading the package, if the downloader 7 finds the connection 10 in use by the network device at any point, it will revert to the beginning of the process so as not to decrease the bandwidth available to the user.

Figure 5:
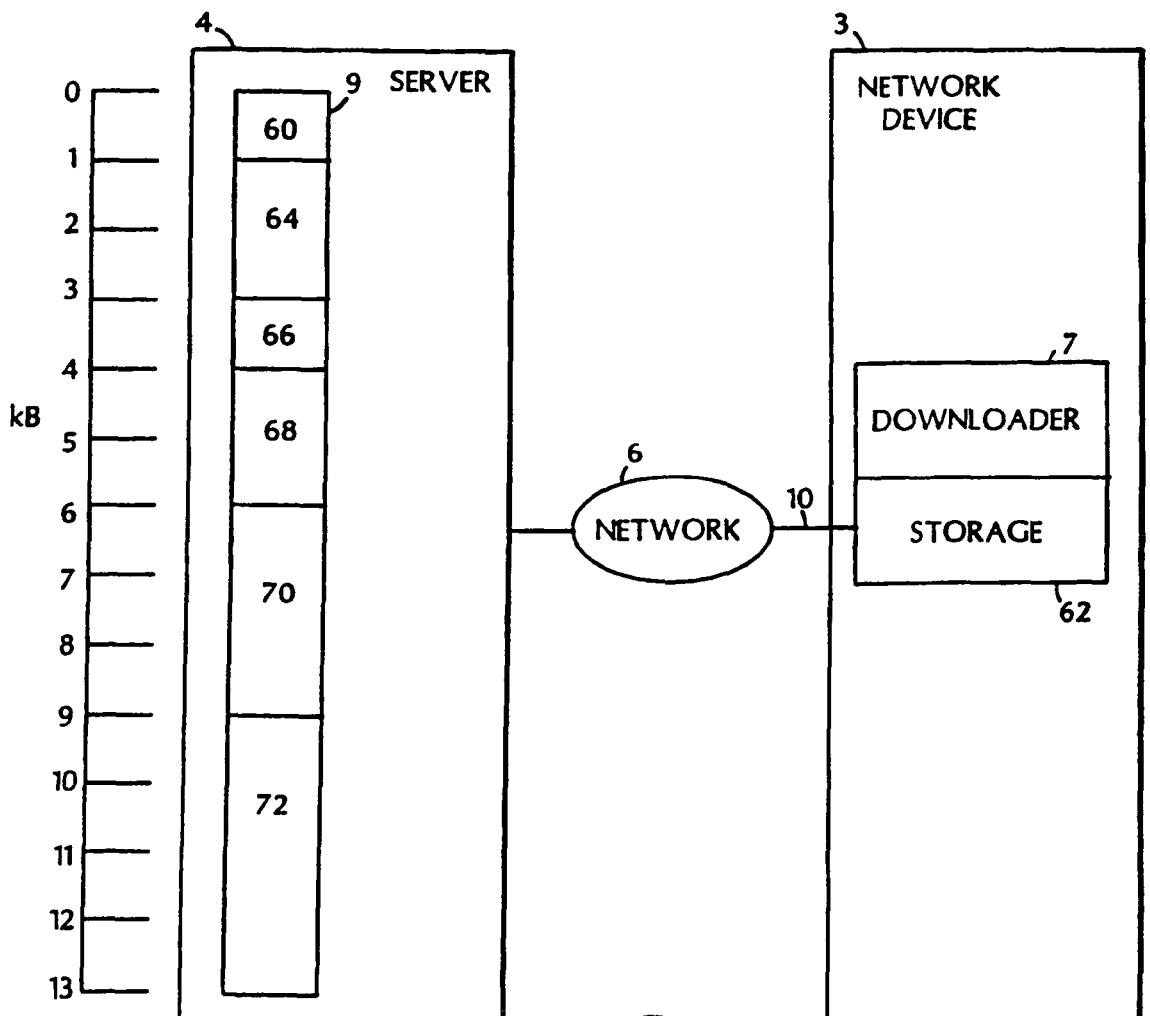
FIG. 5 shows an example of transferring information update packages over a computer network.

An example of how such a process may occur is shown by FIG. 5. The package 9 in this example is thirteen kilobytes in size, and the downloader component 7 is configured to have an initial portion size of zero and to increase the portion size by one kilobyte (kB) each time it retrieves a portion of the package.

Assuming that the downloader 7 initially determines that the connection 10 is unused by the network device 3, the downloader increases the portion size from zero to one kilobyte and transfers a copy of the first kilobyte 60 of the package 9 from the server to a storage 62 associated with the network device 3. The downloader 7 then determines that the transfer is unfinished and checks whether the connection 10 is in use. Assuming that the connection still is unused, the downloader 7 increases the portion size to two kilobytes and transfers the next portion 64 of the package 9.

Transfer of the package 9 is still unfinished, and again the downloader 7 checks if the network device 3 is using the connection 10. Assuming that the connection 10 is now in use by the device 3, the downloader 7 resets the portion size to its original size of zero and enters the sleep mode for a predetermined period of time. The downloader 7 subsequently checks the connection 10, finds that it is unused, increases the portion size from zero to one kilobyte, and retrieves the next portion 66 of the package 9. It then repeats the process of checking the connection 10, increasing the portion size by one kilobyte, and transferring 23 the portions 68, 70 and 72 until the entire package 9 has been transferred.

In some other implementations, the increase in size of transfer can vary. The increases can be in different units than kilobytes, and can increase by some formula such as twice or three times the previous portion size.

In some situations, a network device 3 may be instructed to perform conflicting operations by the listing 8. For example, a specific device might be instructed to install a package that all devices are instructed to uninstall. FIG. 6 shows a set of rules that can be used to resolve such conflicts and can be implemented by the individual downloaders 7.

The automatic downloading process described above can be implemented, for example, in Internet or Web appliances, such as the Intel® Dot.Station™ Web appliance or other personal computers functioning as network devices connected to the Internet. The downloader component 7 can use, for example, the HTTP GET command to obtain the listing 8 and apportioned update packages 9. Other transfer methods such as File Transfer Protocol ("FTP") or NFS also can be used. However, by using the HTTP byte range protocols with the transfer method described above, the size of the downloaded byte chunks can be throttled by the downloader 7. This allows the user to have uninterrupted use of the network during the update process. Also, if the connection 10 is interrupted, HTTP allows the downloader 7 to resume the transfer from where it left off, rather than having to restart the transfer from the beginning.

Advantages of these techniques may include the ability for updates to be made over the course of several user network sessions so as not to impinge on the network connection 10 bandwidth available to the user. In addition, the automation of the distribution can greatly reduce the amount of user participation required for the updating process. All of these factors could create a higher probability of success in updating information on network devices.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the following claims.

What is claimed is:

1. A method comprising:
   retrieving in a network device a listing containing information about available update packages;
   prior to each download of each discrete portion of one of the packages via a computer network connection, determining whether the network device is using the computer network connection;
   if the network connection is not in use, automatically increasing the size of the portion to be transferred and retrieving a copy of the next portion of the package from a server;
   if the network connection is being used, automatically resetting the size of the portion to be transferred to its original state and entering a sleep mode for a period of time before checking the network connection again;
   automatically downloading in sequence each discrete portion of one of the packages until the entire package has been transferred via the computer network connection based on the determination.

2. The method of claim 1 wherein the update packages can contain software, data or document files.

3. The method of claim 1 wherein automatically updating the listing includes retrieving specified update packages based on the listing.

4. The method of claim 1 wherein the listing associates the update packages with network devices to which they apply.

5. The method of claim 1 wherein updating the network device includes:
   removing old versions of the information; and installing new versions of the information.

6. A computer system comprising:
   a computer network;
   a network device coupled to the network via a network connection;
   a downloader associated with the network device;
   a file server coupled to the network and containing update packages; and a managing server coupled to the network and containing a listing about the update packages located on the file server; wherein the downloader is configured to:
   obtain the listing in the network device,
   prior to each download of each discrete portion of one of the packages via the network connection, determine whether the network device is using the network connection,
   if the network connection is not in use, automatically increase the size of the portion to be transferred and retrieve a copy of the next portion of the package from the file server,
   if the network connection is being used, automatically reset the size of the portion to be transferred to its original state and enter a sleep mode for a period of time before checking the network connection again, and
   automatically download in sequence each discrete portion of one of the packages until the entire package has been transferred via the network connection based on the determination.

7. The system of claim 6 wherein information in the listing includes the locations of servers on which the packages are stored.

8. The system of claim 6 wherein the listing associates the update packages with network devices and groups of network devices to which they apply.

9. An article comprising a computer-readable medium that stores computer-executable instruction for causing a computer system to:
   obtain in a network device a listing containing information about available update packages from a managing server;

prior to each download of each discrete portion of one of the packages via a computer network connection, determine whether the network device is using the computer network connection;

if the network connection is not in use, automatically increase the size of the portion to be transferred and retrieve a copy of the next portion of the package from a server containing the update packages;

if the network connection is being used, automatically reset the size of the portion to be transferred to its original state and enter a sleep mode for a period of time before checking the network connection again; and automatically download in sequence each discrete portion of one of the packages until the entire package has been transferred via the computer network connection based on the determination.

10. The article of claim 9 wherein the listing contains information about where the available packages can be obtained by the network device.

11. The article of claim 9 wherein the listing specifies specific packages corresponding to particular network devices.

12. The article of claim 9 wherein updating the network device includes:
removing old versions of the information; and installing new versions of the information.

13. A device comprising:
a processor;
a downloader component in a network device coupled to a network via a computer network connection configured to:
retrieve in the network device a listing stored on a managing server containing information about update packages located on file servers,
prior to each download of each discrete portion of one of the packages via the network connection, determine whether the network device is using the network connection,
if the network connection is not in use, automatically increase the size of the portion to be transferred and retrieve a copy of the next portion of the package from the associated file server storing the package,
if the network connection is being used, automatically reset the size of the portion to be transferred to its original state and enter a sleep mode for a period of time before checking the network connection again, and
automatically download in sequence each discrete portion of one of the packages until the entire package has been transferred via the network connection based on the determination.

14. The device of claim 13 wherein the downloader component comprises a software component stored in the network device's memory.

15. The device of claim 13 wherein the downloader component comprises a hardware component of the network device.

16. The device of claim 13 wherein the listing contains information about where available packages can be obtained by the downloader component.

17. The device of claim 13 wherein the listing specifies specific packages corresponding to particular network devices.

18. The device of claim 13 wherein the computer network connection is a connection to the Internet.

19. The device of claim 13 where the listing contains the information encoded using Extensible Markup Language (XML).

20. The device of claim 13 wherein the downloader component transfers the packages over the computer network connection using the HyperText Transfer Protocol (HTTP) GET command.

* * * * *